US006592693B1

(12) United States Patent
Nedblake

(10) Patent No.: US 6,592,693 B1
(45) Date of Patent: Jul. 15, 2003

(54) METHOD AND APPARATUS FOR LASER CUTTING OF ADHESIVE-BEARING WEBS SEPARATE FROM LINER WEBS

(76) Inventor: Greydon Wesley Nedblake, 9800 N. Revere Ave., Kansas City, MO (US) 64154

( * ) Notice: Subject to any disclaimer, the term of this patent is extended or adjusted under 35 U.S.C. 154(b) by 74 days.

(21) Appl. No.: 09/638,056

(22) Filed: Aug. 11, 2000

(51) Int. Cl.$^7$ .................. B32B 31/08; B32B 31/10; B32B 31/18
(52) U.S. Cl. .................. 156/64; 156/249; 156/248; 156/247; 156/257
(58) Field of Search .................. 156/64, 249, 248, 156/247, 267, 268, 344, 238, 250, 252, 261, 256, 264, 265, 269, 272.8, 273.3, 275.7, 285, 289, 299, 257

(56) References Cited

U.S. PATENT DOCUMENTS

| | | | |
|---|---|---|---|
| 4,475,969 A | * 10/1984 | Reed | .................. 156/152 |
| 5,421,933 A | 6/1995 | Nedblake et al. | |
| 5,487,807 A | 1/1996 | Nedblake et al. | |
| 5,624,520 A | 4/1997 | Nedblake et al. | |
| 5,679,199 A | 10/1997 | Nedblake et al. | |
| 5,681,412 A | 10/1997 | Nedblake et al. | |
| 5,700,340 A | * 12/1997 | Johnson et al. | .................. 156/152 |
| 6,095,218 A | * 8/2000 | Delmolino et al. | .................. 156/256 |

* cited by examiner

Primary Examiner—Richard Crispino
Assistant Examiner—George R. Koch, III
(74) Attorney, Agent, or Firm—Hovey Williams LLP

(57) ABSTRACT

Web processing apparatus (10, 66, 122) for accurate, rapid laser cutting of label stock is provided. The apparatus (10, 66, 122) includes a laser cutting station (12, 68), an adjacent elongated vacuum conveyor (18, 80), and a cut segment attachment station (16, 72, 126) spaced from the cutting station (12, 68). A composite web (20) made up of a preprinted web (22) having a series of axially spaced apart images or segments (58) on one surface and an opposed adhesive-bearing surface (60) and a release-coated liner web (24) is fed to the apparatus (10, 66, 122) and first separated, with the liner web (24) being collected in a takeup roll while the preprinted web (22) is directed along the conveyor (18, 80) through the laser cutting station (12, 68). The individual preprinted segments (58) are laser cut and individually conveyed to the attachment station (16, 72, 126) where they are applied to a liner web (24, 24a). The remainder of the web (22) in the form of a cut matrix web (62) is separated from the individual cut segments (58) via an appropriate takeup or collection device (42, 120, 134). Preferably, an observation sensor (116) is positioned to observe the preprinted segments (58) on the web (22) prior to cutting thereof. This sensor (116) is operably coupled via a controller with the laser cutting device (68), so as to control the operation of the latter and prevent cutting of the web where missing or misprinted images are observed. A secondary sensor (118) is located upstream of the attachment station (72, 126) and controls the movement of the second liner web (24a). In this way, the segments (58) can be evenly spaced and applied to the liner web (24a).

23 Claims, 3 Drawing Sheets

METHOD AND APPARATUS FOR LASER CUTTING OF ADHESIVE-BEARING WEBS SEPARATE FROM LINER WEBS

BACKGROUND OF THE INVENTION

1. Field of the Invention

The present invention is broadly concerned with methods and apparatus for the processing of preprinted continuous label-bearing webs using laser cutting techniques and employing low-cost, lightweight liners as opposed to the relatively thick and more costly liners conventionally used in the production of die cut label products. More particularly, the invention pertains to such methods and apparatus wherein a preprinted label-bearing web is separated from its liner, laser cut preferably using a plurality of computer controlled laser beams to generate individual cut labels, whereupon the individual labels are reapplied either to the original liner or a secondary liner web. Sensors may also be employed for determining the existence of any gaps or misprinted label images on the web, and to responsively control the laser cutter to prevent cutting of the web at such locations. In this way, only labels meeting customer specifications are actually cut and applied to a liner web as final label product.

2. Description of the Prior Art

Laser cutting of label products is now an accomplished fact. In such systems, a computer controlled laser is employed to cut individual labels from a preprinted, continuous web as opposed to prior techniques making use of cutting dies. Such laser production of labels has many advantages, including higher processing speeds and the possibility of eliminating altogether the use of a supporting liner web.

For example, U.S. Pat. No. 5,421,933 describes a system for laser cutting and applying labels from continuous, preprinted label stock. In this disclosure, the preferred system eliminates the need for a liner web and allows successive cutting, adhesive activation and label application onto products. Another embodiment described in the '933 patent involves temporary separation of a liner from the image-bearing label web, with laser cutting occurring during such separation. This embodiment is somewhat limited in its applicability, however, owing to the fact that the laser device is incapable of rapidly cutting complex labels. Moreover, the laser cutting area where the liner is separated from the label web must be relatively small, so that the axial height of each label permits the label to bridge the point of laser cutting and the area of reapplication of the label to the liner. Finally, in this design the cutting laser beam impinges directly on the outer printed surface of the label stock. This has been found to present a problem, particularly with more powerful lasers needed for rapid processing. Specifically, direct impingement of the laser beam onto the printed side of the label-bearing web can cause discoloration of the finished labels. Other specific laser cutting systems for label production are disclosed in U.S. Pat. Nos. 5,487,807, 5,679,199, 5,681,412 and 5,624,520.

Generally, the rate-limiting step in the production of laser cut labels using the foregoing systems is the laser cutting step itself. These prior systems used control algorithms and laser devices which were relatively slow, thereby decreasing the overall output rate of finished label product. This is particularly the case with the previously described gap-cutting embodiment of the '933 patent.

SUMMARY OF THE INVENTION

The present overcomes the problems outlined above and provides apparatus and corresponding methods for processing of a preprinted continuous web having printed thereon a plurality of individual, axially spaced apart segments each having a maximum axial dimension. The method involves providing a continuous, composite web including the preprinted web (having a printed surface bearing axially spaced images or segments and an opposed adhesive-bearing face) and a first liner web (having a release coating on both opposed surfaces thereof). The liner and preprinted webs are initially separated with the preprinted web being passed through a laser cutting station where at least one laser beam is directed against the preprinted web for cutting individual labels or segments therefrom, with the liner web being wound on a collection spindle. After the laser cutting operation, the individual preprinted segments are conveyed along a path of travel substantially longer than the maximum axial dimensions of the segments to an attachment station where the segments are sequentially attached to a second liner web.

In practice, the cut segments are conveyed between the cutting and attachment stations using a supporting conveyor such as an apertured vacuum belt. Furthermore, the preprinted web is preferably oriented in the cutting station and conveyor so that the adhesive-bearing face thereof is proximal to the laser device, i.e., the laser beam(s) impinge upon the adhesive-bearing face rather than the printed face. The cut segments are conveyed in this orientation to the attachment station where they are applied to a liner web. This liner web may be the original web forming a part of the composite web, or a separate liner web. The preferred control of the invention allows the laser beam(s) to be controlled in such a way that the preprinted web is moved at a substantially constant speed through the cutting station, This compares with certain prior art systems where, in order to accommodate complex label designs, it was necessary to speed up or slow down the web speed through the cutting station.

In preferred embodiments, the web processing apparatus of the invention includes a sensor positioned upstream of the web cutting station which observes the printed images as they move into the cutting, station. This sensor is coupled through a controller to the laser device. If missing or misprinted segment images are detected, an appropriate control signal is sent to the laser device to prevent cutting of the preprinted web at the region of the missing or misprinted images. Similarly, in embodiments using a second liner web, another sensor is located upstream of the attachment station which is connected via the controller to the second liner web for the cut segments. Thus, if this sensor detects an absence of cut segments (which would occur in the event of operation of the first sensor as described), then movement of the second liner web is terminated or otherwise adjusted so that properly printed segments are evenly spaced on the final label product web.

A prime advantage of the present invention is that use can be made of relatively thin, inexpensive liner webs, as opposed to the heavier webs typically required in label die cutting systems. Moreover, where separate liner webs are employed, it is only necessary to purchase one additional liner web. During each processing run, a fresh liner web is collected in roll form, and can be used as the cut segment support liner web for the next run.

DETAILED DESCRIPTION OF THE PREFERRED EMBODIMENT

Figure 1:
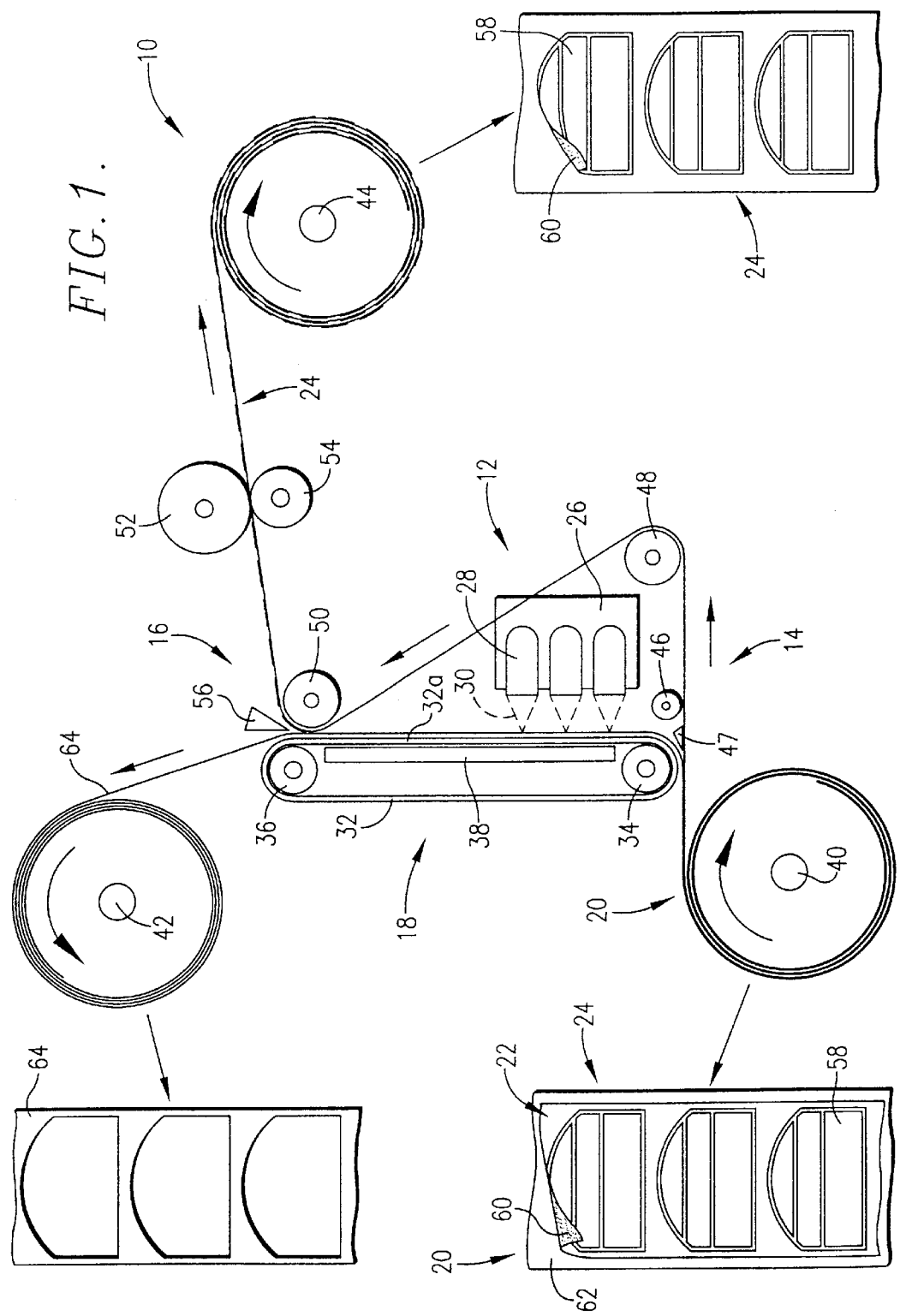
FIG. 1 is a schematic side view of web processing apparatus in accordance with the invention, for laser cutting of preprinted segments or labels and making use of only a single liner web.

Turning now to the drawings, FIG. 1 depicts web processing apparatus 10 designed for the efficient, high-speed laser cutting of preprinted segments or labels, and the subsequent collection thereof on a liner roll. Broadly speaking, the apparatus 10 includes a web cutting station 12, web handling apparatus broadly referred to by the numeral 14, an attachment station 16 designed to apply cut labels to a liner, and a cut segment conveyor 18 extending between the cutting station 12 and attachment station 16. The apparatus 10 is designed to process a composite web 20 made up of a preprinted web 22 and a first liner web 24.

In more detail, the cutting station 12 includes a laser device 26 having at least one and preferably a plurality of laser outputs 28 each designed to direct a laser beam for cutting purposes. As shown, the conveyor 18 is adjacent the station 12 and includes an elongated, continuous, apertured vacuum belt 32 trained about end rollers 34, 36. A vacuum manifold 38 is positioned beneath the rightmost run 32a of belt 30 and is coupled with a vacuum pump (not shown).

The web handling apparatus 14 includes three roll-supporting spindles 40, 42 and 44, separator roller 46, idler roller 48, nip roller 50 and opposed press rollers 52, 54. The spindle 40 is designed to hold a roll of the composite web 20, whereas spindles 42 and 44 are takeup spindles for waste matrix and completed, cut labels on the liner web 24, respectively. As shown, in alternate forms a stationary peel plate 47 may be positioned adjacent roller 34 to cooperate in separation of the composite web 20 as will be explained.

The attachment station 16 is preferably in the form of an air knife 56 positioned between nip roller 50 and the end of belt 32 adjacent roller 36. Other equivalent devices for attachment of cut labels to the liner web 24 may be used in this context.

As illustrated, the composite web 20 is made up of the preprinted web 22 having a series of axially spaced apart, preprinted segments or images 58 on one surface thereof, with the other opposed surface having adhesive 60 applied thereto. The liner web 24 is typically slightly wider than the web 22 and has a release coating 62 on the face thereof supporting the adhesive-bearing surface of the web 22.

In the use of apparatus 10, the composite web 20 is loaded onto spindle 40, and the preprinted web 22 is threaded through cutting station 12 in overlying relationship to the run 32a of belt 30, attachment station 16 and onto takeup spindle 42. The liner web 24 is threaded past separator roller 46, around idler and nip rollers 48, 50, through the press rollers 52, 54, and onto takeup spindle 44. The web handling apparatus 14 is then started so as to feed the webs along their respective paths. It will be observed in this respect that the web 22 passes through station 12 with the adhesive-bearing face thereof proximal to the laser device 26. Further, if the plate 47 is used, clean separation of the liner web 24 from the preprinted web 22 is assured.

As the preprinted web 22 continuously passes through the cutting station 12, the laser device 26 is activated so as to cut each of the individual segments 58 from the web. At the same time, the belt 32 is moved so that run 32a thereof passes from station 26 towards and to attachment station 16, and a vacuum is drawn through the belt run via manifold 38. In the cutting station, the laser beams 30 are directed against the adhesive-bearing face of the web 22 in such a manner as to cut the individual labels or segments 58 from the web. In this regard, the individual beams 30 are computer controlled so as to completely cut around the segments 58, allowing complete separation thereof from the remainder of the web 22.

After the segments 58 are cut, they are adhered to the run 32a of belt 30 by virtue of the vacuum drawn through manifold 38. These segments 58 thereupon travel a significant axial distance from the station 12 to the station 16, which is greater than the maximum axial dimensions of the segments 58. It will be observed that the individual segments 58 are spaced axially on the belt 32 during'such travel. It will also be noted that the uncut remainder of the web 22, generally referred to as a matrix web 62, is also carried along with the cut segments 58 towards and into the station 16.

At the attachment station 16, the individual segments 58 are separated by the air knife 56 from the belt 32 and are transferred to the adjacent liner web 24 trained about the roller 50. As shown, these cut segments are applied to the web 24 adhesive side down in an axially spaced fashion. The liner 24, with the segments 58 thus applied, are wound into a roll on spindle 44 for later use. While this is occurring, the matrix web 64 is taken up on spindle 42.

A chief advantage of the apparatus 10 is that it permits use of a low cost, very thin liner web 24 which would be insufficient to support the web 22 for conventional die cutting operations. In practice, liner webs on the order of 0.75 mil can be used in this invention, as compared with conventional liner webs which have thickness of 2–3 mils. This represents a considerable material savings for the process. In addition, the use of the laser device 26 in station 12, and its associated software control, allows run speeds of 500 ft/min. or more.

Figure 2:
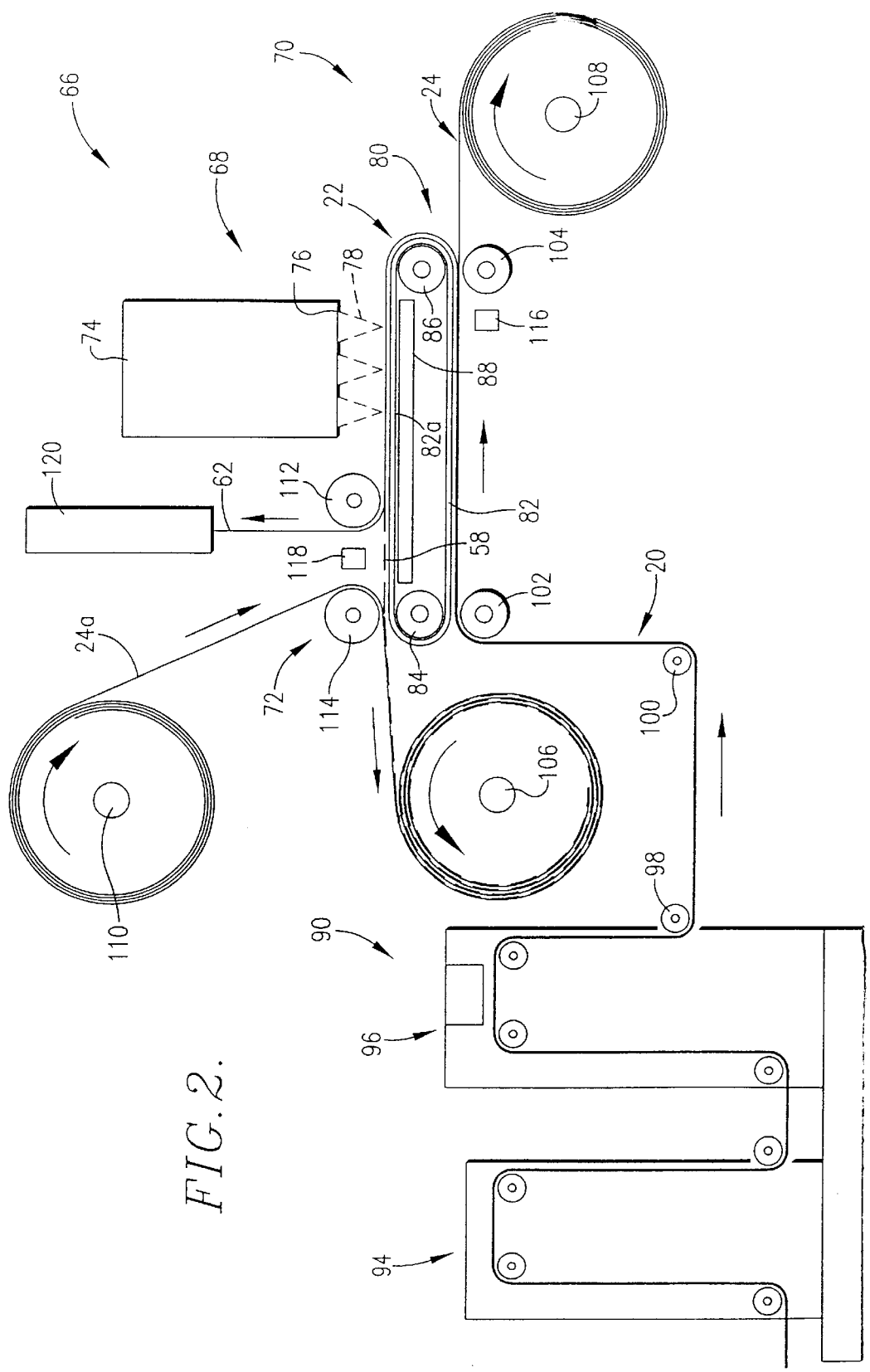
FIG. 2 is a schematic side view of another laser cutting web processing apparatus making use of a pair of liner webs and including control sensors for controlling the operation of the laser device to prevent cutting of misprinted segments or labels.

FIG. 2 depicts a similar web processing apparatus 66. Here again, the apparatus 66 includes a cutting station 68, web handling apparatus 70, and attachment station 72.

The cutting station 68 includes a laser device 74 preferably having a plurality of outputs 76 operable to deliver plural laser beams 78. A conveyor 80 is situated adjacent the station 68 and includes a continuous, apertured vacuum belt 82 trained about end rollers 84, 86. The belt 82 presents an upper run 82a adjacent station 68 as shown. Additionally, a vacuum manifold 88 is positioned beneath run 82a and is connected with a vacuum pump not shown.

In the illustrated embodiment, a printing press 90 is illustrated as the source of composite web 20 for the apparatus 66. This differs from the embodiment of FIG. 1, e.g., which illustrated the use of a wound roll of preprinted composite web 20. In any case, the press 90 is of conventional design and for illustration purposes only includes a pair of in-line printing towers 94, 96. The composite web 20 passing through the press 90 includes, as in the case of the first embodiment, a printed web 22 and a liner web 24.

The web handling apparatus 70 includes support rollers 98, 100 as well as larger rollers 102, 104 located beneath conveyor belt 82. In addition, the web handling apparatus includes two takeup spindles 106, 108 for supporting roll stock, as well as a similar delivery spindle 110. The assembly 70 is completed by provision of an idler roller 112 downstream of laser device 74, as well as a nip roller 114 at attachment station 72.

A pair of sensors 116, 118 are located adjacent the underside of belt 82 proximal to roller 104, and close to attachment station 72. The purpose of sensor 116 is to observe the preprinted segments on the web 22; this sensor is coupled via a controller with the laser device 74 so that the latter will not cut improperly printed segments, as explained in more detail below. The sensor 118 on the other hand is coupled via the controller to the spindles 106, 110 for control thereof. Finally, a vacuum takeup device 120 is provided adjacent roller 112 for takeup of the cut matrix web 62.

The operation of apparatus 66 is similar to that described with reference to station 10. However, there are several significant differences. First, in apparatus 10, the liner web 24 was cycled through the apparatus so that it was used as a support for the cut segments 58. In the FIG. 2 apparatus however, use is made of two liner webs, mainly the initial liner web 24*a* forming a part of the composite web 20, and an additional or secondary liner web 24*a* which is used to support the cut segments. Second, the use of the sensors 116, 118 provides greatly improved operation and cost savings, owing to the ability to eliminate improperly printed segments 58 so that they are not applied to the finished roll of product.

In detail, as the composite web 20 passes from press 90, it is threaded into and through apparatus 60. The web proceeds in a composite fashion until roller 104 is reached, whereupon the webs making up the composite are separated, with the liner web 24 being taken up on spindle 108 whereas the preprinted web 22 passes around the end of conveyor 80 and along the length of run 82*a* of belt 82. At this point, the adhesive-bearing face of the web 22 faces upwardly. After cutting, the web 22 is collected as the cut matrix 62 by vacuum takeup 120.

As the web 22 traverses run 82*a*, it first encounters the laser device 74 within station 68. As described previously, the respective laser beams 78 are computer controlled so as to laser cut the individual segments 58 from the web 22. The cut segments 58 and the matrix web 62 proceed along the length of the conveyor, held in place by the vacuum drawn through the apertured belt 82. At roller 112, the cut matrix web 62 passes upwardly and is collected in the takeup device 120. The cut segments 58, axially spaced along the length of the belt 82, proceed leftwardly as viewed in FIG. 2 to attachment station 72. At the attachment station, the individual segments 58 are applied to the second liner web 24*a*. This liner web as shown is threaded from the supply roll on spindle 110 around nip roller 114, for takeup on spindle 106. At the takeup station 72, the segments 58 are individually adhered to the web 24*a* to form the final product.

The sensors 116, 118 operate during the above sequence in order to facilitate rapid, on-the-fly editing of the preprinted web 22. That is, the sensor 116 is a video-type observational sensor which views each of the respective preprinted segments 58 and compares such to an appropriate standard stored in memory. If the sensor 116 determines that one or more segments 58 are missing or improperly printed, a signal is sent to the controller which in turn shuts down the laser device 74 in an appropriate time way so that the portion of the web 22 with the missing segments or improperly printed segments is not cut. Hence, only preprinted segments 58 which meet customer specifications are cut by the laser device 74 and delivered to attachment station 72. The sensor 118 controls the movement of second liner web 24*a*. That is, if the sensor 118 detects that no cut segments 58 are present, the movement of web 24*a* is stopped until cut segments are again detected. In this way, the final product roll collected on spindle 106 does not have any gaps where no segments are attached. This greatly eases ultimate use of the final product by the processor.

Figure 3:
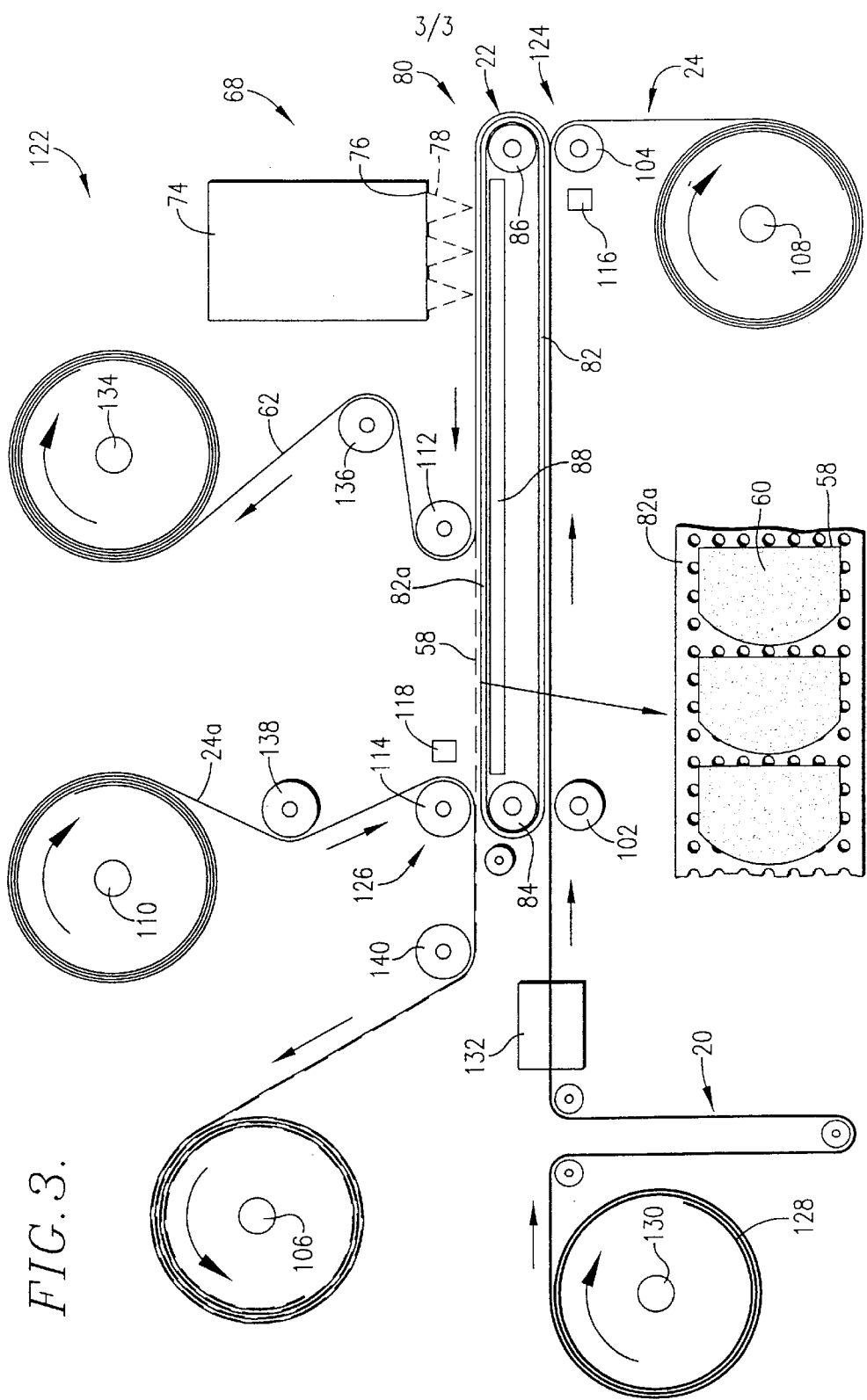
FIG. 3 is a schematic view of a third laser cutting web processing apparatus similar to that of FIG. 2 but also including a web editing module.

Turning next to FIG. 3, a processing apparatus 122 is depicted which is in many respects identical to that of FIG. 2. Accordingly, like reference numerals are used in FIG. 3 where the structure is essentially the same. Briefly, the apparatus 122 includes a cutting station 68 equipped with a laser device 74 having multiple outputs 76 for generation of plural laser beams 78. Moreover, the web handling apparatus 124 of this unit includes rollers 102, 104, 112 and 114, as well as liner takeup spindle 108, secondary liner supply spindle 110 and product takeup spindle 106. A conveyor 80 is also provided, having endmost support rollers 84, 86 as well as a continuous, apertured vacuum belt 82 presenting an upper run 82*a*. Sensors 116 and 118 respectively located adjacent rollers 104 and 114 provide the same type of control described previously. Finally, an attachment station 126 is provided generally at the location of the roller 114.

The apparatus 122 differs from apparatus 66 in several respects. First, instead of a printing press feed for the composite web 20, in this instance a roll 128 thereof is provided on distribution spindle 130. This web 20 passes through a festoon-type comparator/editing system 132 of known design which provides a preliminary editing function, i.e., it edits the incoming composite web by removing unprinted or otherwise improper sections thereof, prior to feeding of the composite web to the remainder of the apparatus 122. Additionally, a cut matrix takeup spindle 134 is provided in lieu of the vacuum takeup provided in the FIG. 2 embodiment. An additional idler roller 136, located between the roller 112 and spindle 134, facilitates proper takeup of the cut matrix onto the spindle 134. Finally, the path of second liner web 24*a* is somewhat different in this embodiment, as compared with that of FIG. 2, principally owing to space considerations and the use of the spindle 130 and device 132. In particular, the web 24*a* passes around a first idler 138, then around nip roller 114, then around a second idler roller 140, and is ultimately wound on takeup spindle 106.

As will be readily appreciated from the foregoing description, the operation of apparatus 122 is very similar to that of apparatus 66. As before, the composite web 20 is separated at the region of roller 104, with the liner 24 being taken up on spindle 108; the preprinted web 22 passes around the end of the conveyor 80 and along the length of run 82*a*, with the adhesive-bearing face of the web facing upwardly. The cut segments 58 are spaced along the length of the vacuum belt and are held in place thereon until the attachment station 126 is reached; the path of travel of the cut segments 58 is substantially greater than the maximum axial dimensions thereof. At this point, the individual segments are applied to the attachment web. Simultaneously, the matrix web 62 is collected on spindle 134. The sensors 116, 118 operate exactly as described previously.

It will be appreciated that the exemplary embodiments described herein are illustratively only and that many other alterations in the specific hardware and control systems may be used at the discretion of the designer. A presently preferred control system is disclosed in pending application for U.S. Letters Patent entitled "Tracking Controller for a Laser Cutting System" filed Apr. 8, 1998, Ser. No. 09/058,666, which is incorporated by reference herein. Generally speaking, appropriate control systems include a computer operatively coupled with the various components of the web processing apparatus. For example, in the case of the embodiment of FIG. 2, the computer would be coupled with, inter alia, the sensor 116, laser device 74 and the drive conveyor 80 so that, when the sensor 116 senses absent or improperly printed image(s), the operation of laser device 74 is terminated in timed relationship with the movement of web 22, thus preventing the cutting of sections from the web at the improper area(s). Likewise, the computer would be coupled to the sensor 118 and the drives for the spindles 106 and 10 so that the web 24*a* is moved as necessary and at the appropriate speed to pick up the individually cut segments 58 in proper orientation on web 24. Implementation of specific software routines to accomplish these ends is well within the skill of the art.

I claim:

1. A method of processing a preprinted web having printed thereon a plurality of individual, axially spaced apart segments each having a maximum axial dimension, said method comprising the steps of:

providing a continuous, composite web including said preprinted web and a first liner web;

separating said preprinted web from said first liner web;

passing said preprinted web through a cutting station, and, during such passage, directing at least one laser beam against said preprinted web in order to cut said individual segments from the preprinted web;

conveying each of said cut, individual segments along a path of travel substantially longer than said maximum axial dimensions of the segments from said cutting station to an attachment station, said path of travel being of a length such that a plurality of said cut segments are simultaneously present along said path of travel; and attaching each of said segments to a second liner web in said attachment station.

2. The method of claim 1, said conveying step comprising the steps of holding said cut, individual segments on a moving support extending between said cutting station and said attachment station.

3. The method of claim 2, said moving support comprising an apertured vacuum belt, said conveying step comprising the step of holding said cut, individual segments on said belt by application of a vacuum through the vacuum belt.

4. The method of claim 1, said first and second liner webs being the same web.

5. The method of claim 1, said first and second liner webs being different liner webs.

6. The method of claim 1, said preprinted web having a printed face and an opposed, adhesive-bearing face, said cutting step comprising the steps of passing said preprinted web through said cutting station and causing said laser beam to impinge upon said adhesive-bearing face.

7. The method of claim 1, including the step of directing a plurality of laser beams against said preprinted web for cutting of said segments therefrom.

8. The method of claim 1, including the step of winding said second liner web with said segments applied thereto to form a roll.

9. The method of claim 1, including the step of collecting the remainder of said preprinted web after said cutting of said individual segments therefrom.

10. The method of claim 1, including the step of observing said preprinted segments on said preprinted web prior to said segment cutting step, and controlling the operation of said laser beam so as to prevent cutting of any improperly printed segments observed during said observing step.

11. The method of claim 10, including the step of sensing cut segments during said conveying step, and controlling the movement of said second liner web in response to said sensing so as to apply said cut segments at predetermined locations on the second liner web.

12. The method of claim 1, including the step of passing said preprinted web through said cutting station at a constant rate, notwithstanding the magnitude of the maximum axial dimensions of said preprinted segments.

13. A method of processing a preprinted web having printed thereon a plurality of individual, axially spaced apart segments, said method comprising the steps of:

providing a continuous, composite web including said preprinted web and a first liner web;

separating said preprinted web from said liner web;

observing said preprinted web to determine if any of said segments are improperly printed thereon;

after said observing step, passing said preprinted web through a cutting station, and, during such passage, directing at least one laser beam against said preprinted web in order to cut said individual segments from the preprinted web, said cutting step including the step of controlling the operation of said laser beam in response to said observing step so as to prevent the laser cutting of said improperly printed segments, conveying each of said cut, individual segments along a path of travel to an attachment station; and attaching each of said segments to a second liner web in said attachment station.

14. The method of claim 13, said conveying step comprising the steps of holding said cut, individual segments on a moving support extending between said cutting station and said attachment station.

15. The method of claim 13, said moving support comprising an apertured vacuum belt, said conveying step comprising the step of holding said cut, individual segments on said belt by application of a vacuum through the vacuum belt.

16. The method of claim 13, said first and second liner webs being the same web.

17. The method of claim 13, said first and second liner webs being different liner webs.

18. The method of claim 13, said preprinted web having a printed face and an opposed, adhesive-bearing face, said cutting step comprising the steps of passing said preprinted web through said cutting station and causing said laser beam to impinge upon said adhesive-bearing face.

19. The method of claim 13, including the step of directing a plurality of laser beams against said preprinted web for cutting of said segments therefrom.

20. The method of claim 13, including the step of winding said second liner web with said segments applied thereto to form a roll.

21. The method of claim 13, including the step of collecting the remainder of said preprinted web after said cutting of said individual segments therefrom.

22. The method of claim 13, including the step of sensing cut segments during said conveying step, and controlling the movement of said second liner web in response to said sensing so as to apply said cut segments at predetermined locations on the second liner web.

23. The method of claim 13, each of said segments presenting a maximum axial dimension, said method including the step of passing said preprinted web through said cutting station at a constant rate, notwithstanding the magnitude of the maximum axial dimensions of said preprinted segments.

* * * * *